United States Patent
Cath et al.

(10) Patent No.: US 10,785,281 B1
(45) Date of Patent: Sep. 22, 2020

(54) BREAKING DOWN THE LOAD TIME OF A WEB PAGE INTO COHERENT COMPONENTS

(71) Applicant: Cisco Technology, Inc., San Jose, CA (US)

(72) Inventors: Adam Ross Cath, San Francisco, CA (US); Swathi Bhat, Campbell, CA (US); Maxwell Taylor Virgil, San Francisco, CA (US); Brian Robert Zaik, San Francisco, CA (US); Puneet Anand, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/293,913

(22) Filed: Mar. 6, 2019

(51) Int. Cl.
*G06F 15/173* (2006.01)
*H04L 29/08* (2006.01)
*H04L 12/24* (2006.01)
*H04L 29/12* (2006.01)

(52) U.S. Cl.
CPC ........ *H04L 67/025* (2013.01); *H04L 41/0681* (2013.01); *H04L 41/22* (2013.01); *H04L 61/1511* (2013.01); *H04L 67/2814* (2013.01)

(58) Field of Classification Search
CPC ............... H04L 67/025; H04L 67/2814; H04L 41/0681; H04L 61/1511
USPC ........................................................ 709/224
See application file for complete search history.

(56) References Cited

U.S. PATENT DOCUMENTS

| | | | |
|---|---|---|---|
| 2013/0166634 A1 | 6/2013 | Holland | |
| 2016/0188445 A1 | 6/2016 | Hermeto et al. | |
| 2017/0237635 A1* | 8/2017 | Veeravalli | G06T 11/206 709/224 |
| 2019/0130045 A1* | 5/2019 | Jindal | G06F 15/17331 |

OTHER PUBLICATIONS

Jain, et al., "Resource Timing Level 1", Online: https://www.w3.org/TR/resource-timing-1/, W3C Candidate Recommendation, Mar. 2017, 21 pages, W3C.

(Continued)

*Primary Examiner* — Wing F Chan
*Assistant Examiner* — Joseph R Maniwang
(74) *Attorney, Agent, or Firm* — Behmke Innovation Group LLC; James M. Behmke; Jonathon P. Western

(57) ABSTRACT

In one embodiment, a monitoring process monitors timing of navigations and resources of a web page load, and attributes timing of the navigations and resources into corresponding timing components. In particular, the monitoring process may attribute timing of static first-party resources and timing of hypertext transfer protocol (HTTP) redirects to a core frontend timing component, and may attribute timing of dynamic first-party resources to a core backend timing component. The monitoring process may also attribute timing of content delivery network (CDN) resources to a CDN timing component, and may attribute timing of non-CDN third-party resources to a third-party timing component. Lastly, the monitoring process may further attribute timing of network infrastructure connections to a core connections timing component. Accordingly, the monitoring process may then perform one or more actions based on the attributing steps.

20 Claims, 13 Drawing Sheets

(56) References Cited

OTHER PUBLICATIONS

Wang, Zhiheng, "Navigation Timing", online: https://www.w3.org/TR/navigation-timing/, W3C Recommendation, Dec. 2012, 14 pages, W3C.
International Search Report dated May 15, 2020 in connection with PCT Application No. PCT/US2020/020019.

* cited by examiner

| NAME 1010 | DEFINITION 1020 | ACTIONABLE ROOT CAUSES 1030 | LIMITATIONS/ CONFLATING FACTORS 1040 |
|---|---|---|---|
| Core Connections 1010 | dnsStart to connectEnd for all 1st-party resources. | <ul><li>DNS Misconfiguration.</li><li>SSL Misconfiguration.</li><li>Nameserver misconfiguration/saturation.</li><li>Middleware misconfiguration/saturation.</li><li>Datacenter network misconfiguration/saturation.</li><li>Server CPU/memory/NIC/disk saturation.</li><li>Webserver misconfiguration/saturation.</li><li>Appserver misconfiguration/saturation.</li><li>App bug/saturation.</li></ul> | <ul><li>Latency or limited bandwidth.</li><li>Client machine saturation.</li><li>Public DNS problem.</li><li>PKI problem.</li></ul> |
| Core Backend 1012 | requestStart to responseEnd time for the base page requestStart to responseEnd 1st party dynamic resources (AJAX, Fetch API calls, Websockets, etc). | <ul><li>Server CPU/memory/NIC/disk saturation.</li><li>Hidden buffering due to TCP window sizes, NIC offloading, OS/driver queuing.</li><li>Webserver misconfiguration/saturation.</li><li>Appserver misconfiguration/saturation.</li><li>App bug/saturation.</li><li>Downstream tier bug/saturation.</li></ul> | <ul><li>Latency or limited bandwidth.</li><li>Routers that don't fragment packets properly.</li><li>Client machine saturation.</li><li>Resources not optimized (rare).</li></ul> |

| NAME 1010 | DEFINITION 1020 | ACTIONABLE ROOT CAUSES 1030 | LIMITATIONS/ CONFLATING FACTORS 1040 |
|---|---|---|---|
| ... | | | |
| Core Frontend 1013 | requestStart to responseEnd for all non-backend 1st party resources. Redirect time for all 1st party and CDN resources. All times between navigationStart and loadEventEnd when nothing else is happening. | • Resources not optimized (compress, minify, cache). <br> • Critical path not optimized (eliminate, defer, parallelize). <br> • Stale URLs. <br> • Inefficient Javascript/CSS/HTML. <br> • Expensive use of video or WebGL. | • Latency or limited bandwidth. <br> • Client machine saturation. <br> • Public DNS problem. <br> • PKI problem. |
| CDN 1014 | fetchStart to responseEnd for CDN resources. | • Resources not optimized (compress, minify, cache). <br> • Critical path not optimized (eliminate, defer, parallelize). <br> • Vendor POPs not actually near your users. <br> • Vendor SLA violation. | • Latency or limited bandwidth. <br> • Client machine satration. <br> • Public DNS problem. <br> • PKI problem. |
| 3rd Party Content 1015 | All time for resources from non-CDN 3rd parties. | • Critical path not optimized (eliminate, defer, parallelize). <br> • Vendor SLA violation. | • Latency or limited bandwidth. <br> • Intermittent radio contact (seems like congestion). <br> • Routers that don't fragment packets properly. <br> • Client machine saturation. <br> • Server-side problems (rare). |

BREAKING DOWN THE LOAD TIME OF A WEB PAGE INTO COHERENT COMPONENTS

TECHNICAL FIELD

The present disclosure relates generally to computer networks, and, more particularly, to breaking down the load time of a web page into coherent components.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In one particular example, the performance of a webpage is influenced by multiple architectural components, often owned by different teams within a customer organization. Identifying which component is the bottleneck is a key step in performance optimization/troubleshooting, because it narrows the investigation greatly and allows customers to route problems to the right team.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 10A-10B illustrate an example chart of time components and associated actionable root causes.

DESCRIPTION OF EXAMPLE EMBODIMENTS

Overview

Figure 1A:
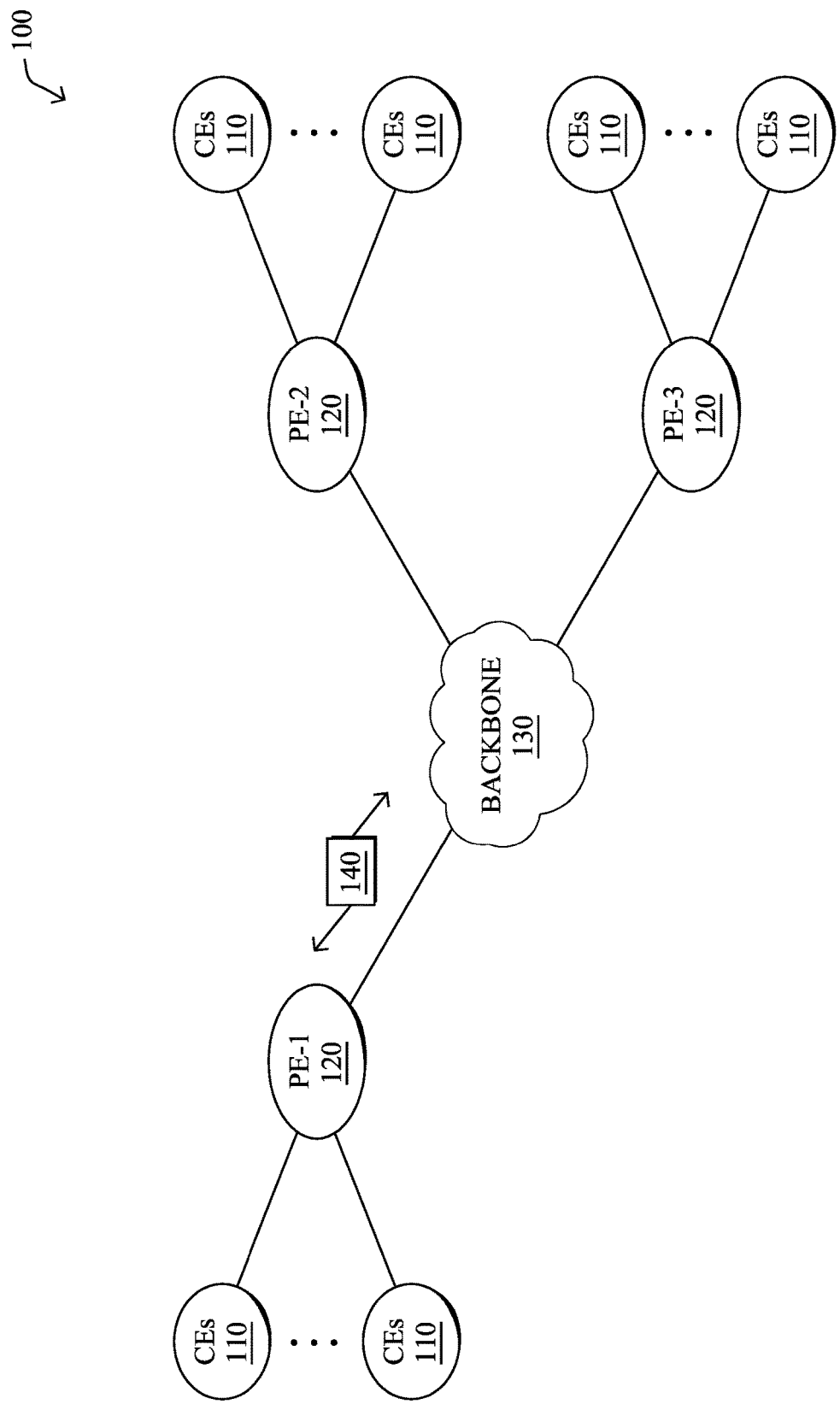
FIGS. 1A-1B illustrate an example computer network.

According to one or more embodiments of the disclosure, a monitoring process monitors timing of navigations and resources of a web page load, and attributes timing of the navigations and resources into corresponding timing components. In particular, the monitoring process may attribute timing of static first-party resources and timing of hypertext transfer protocol (HTTP) redirects to a core frontend timing component, and may attribute timing of dynamic first-party resources to a core backend timing component. The monitoring process may also attribute timing of content delivery network (CDN) resources to a CDN timing component, and may attribute timing of non-CDN third-party resources to a third-party timing component. Lastly, the monitoring process may further attribute timing of network infrastructure connections to a core connections timing component. Accordingly, the monitoring process may then perform one or more actions based on the attributing steps.

According to one or more further embodiment herein, the monitoring process may also divide the timing of the web page load into discrete spans, each span beginning at a corresponding start of either a navigation or a resource, and in response to a plurality of particular timing components being concurrently active during any particular span, may prorate that particular span across the plurality of particular timing components (e.g., distributing a timing of that particular span to each of the plurality of particular timing components based on a number of resources and navigations in each respective timing component of the plurality of particular timing components).

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
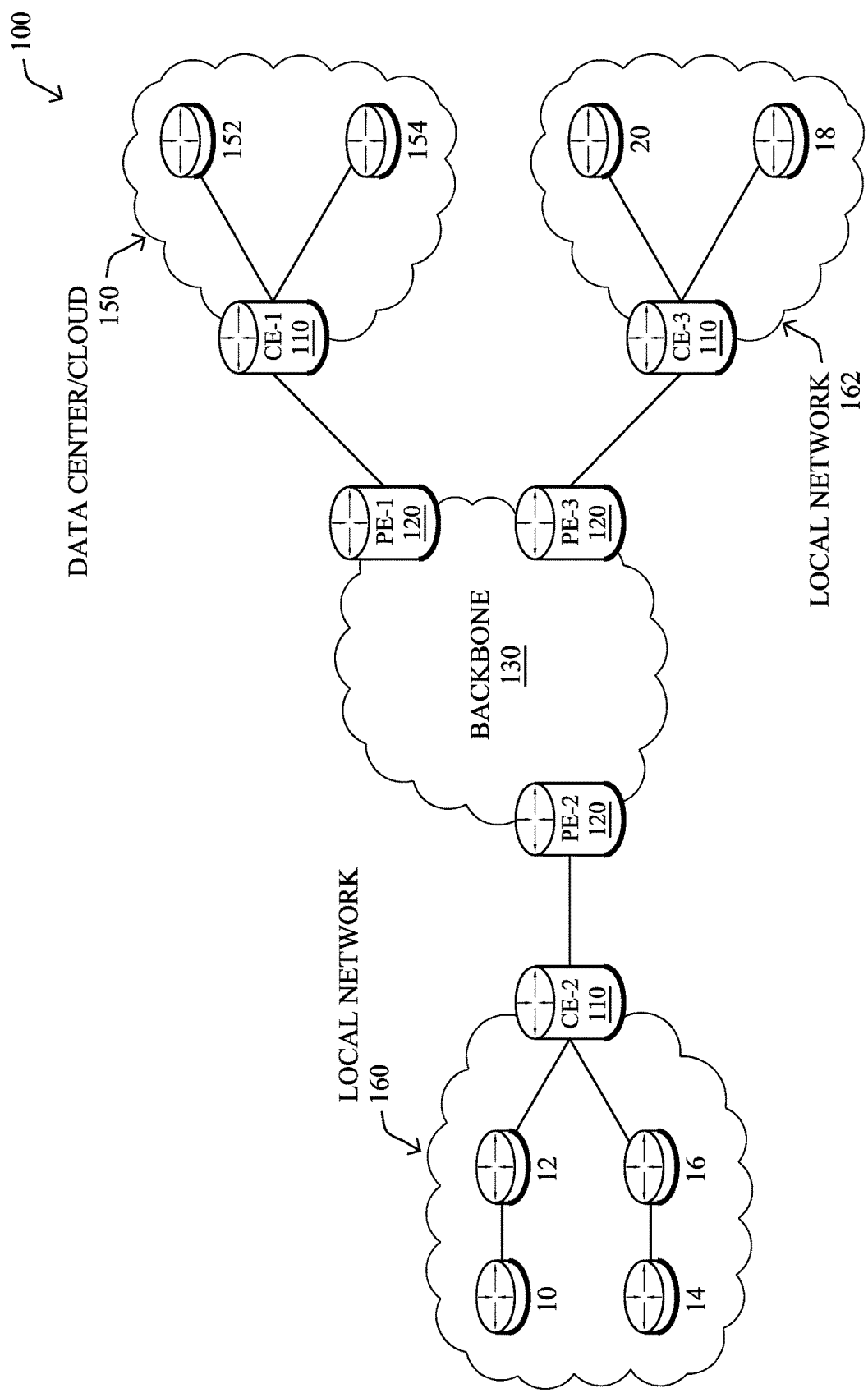

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
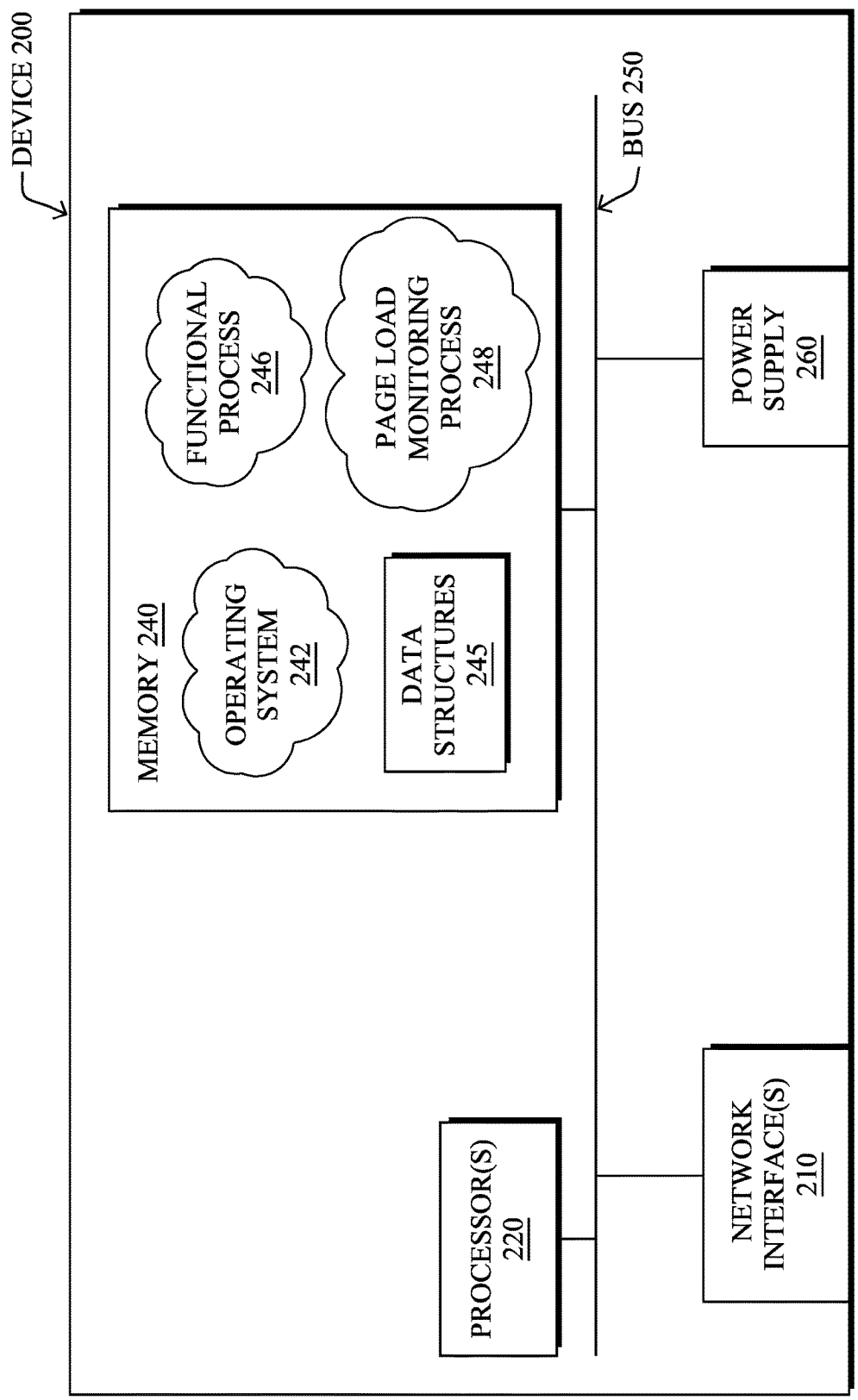
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "Page Load Monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application is consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
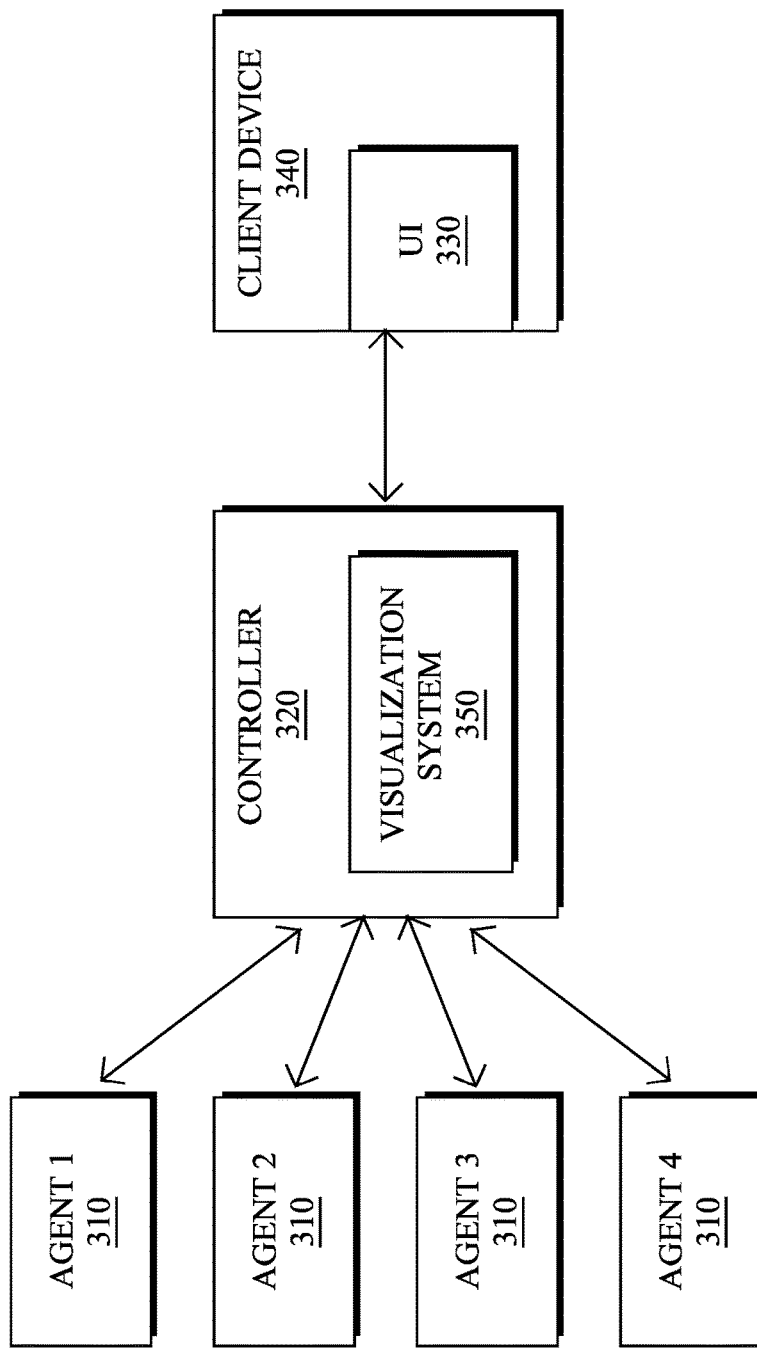
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
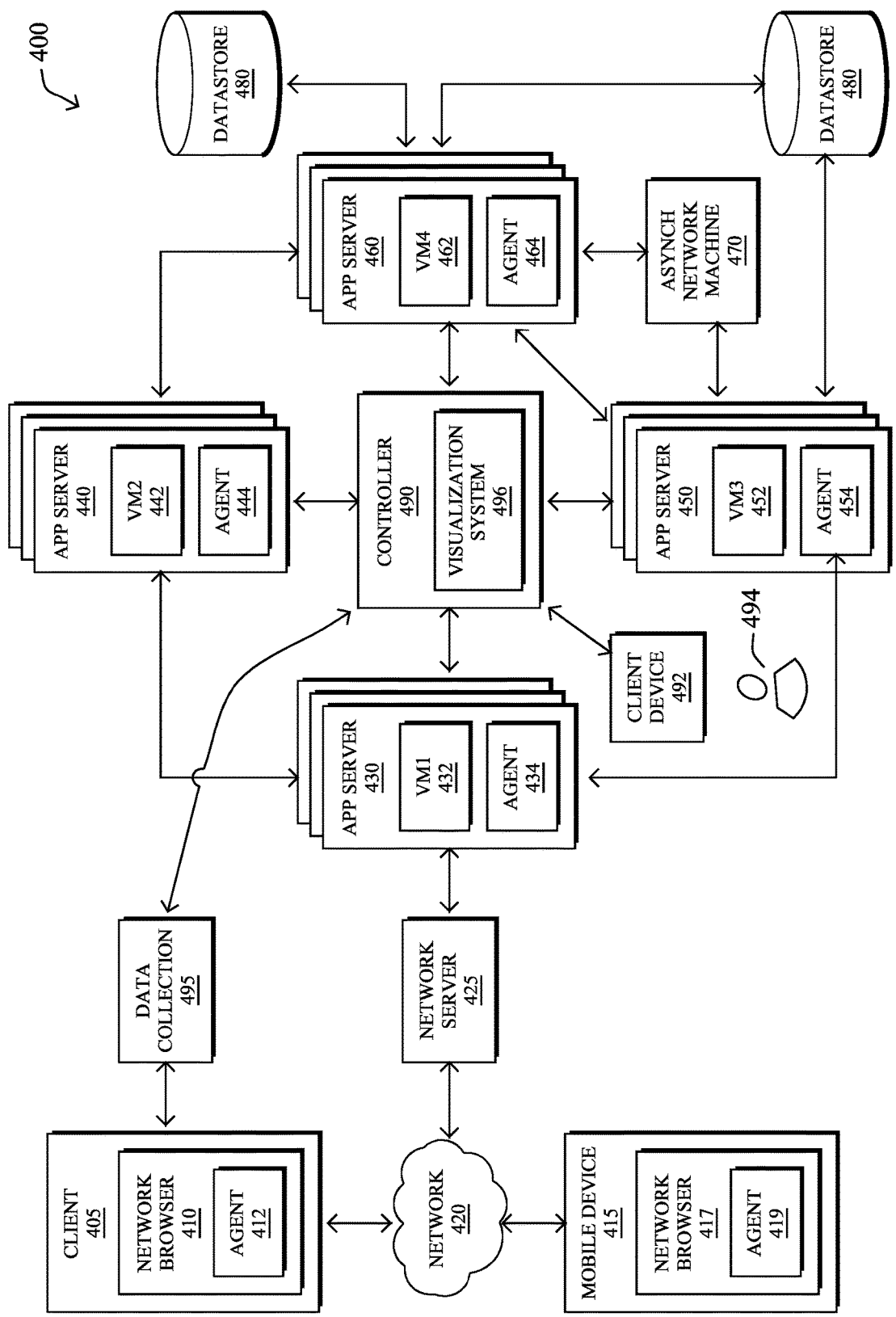
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node .JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node .JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node .JS, and other applications.

Figure 5:
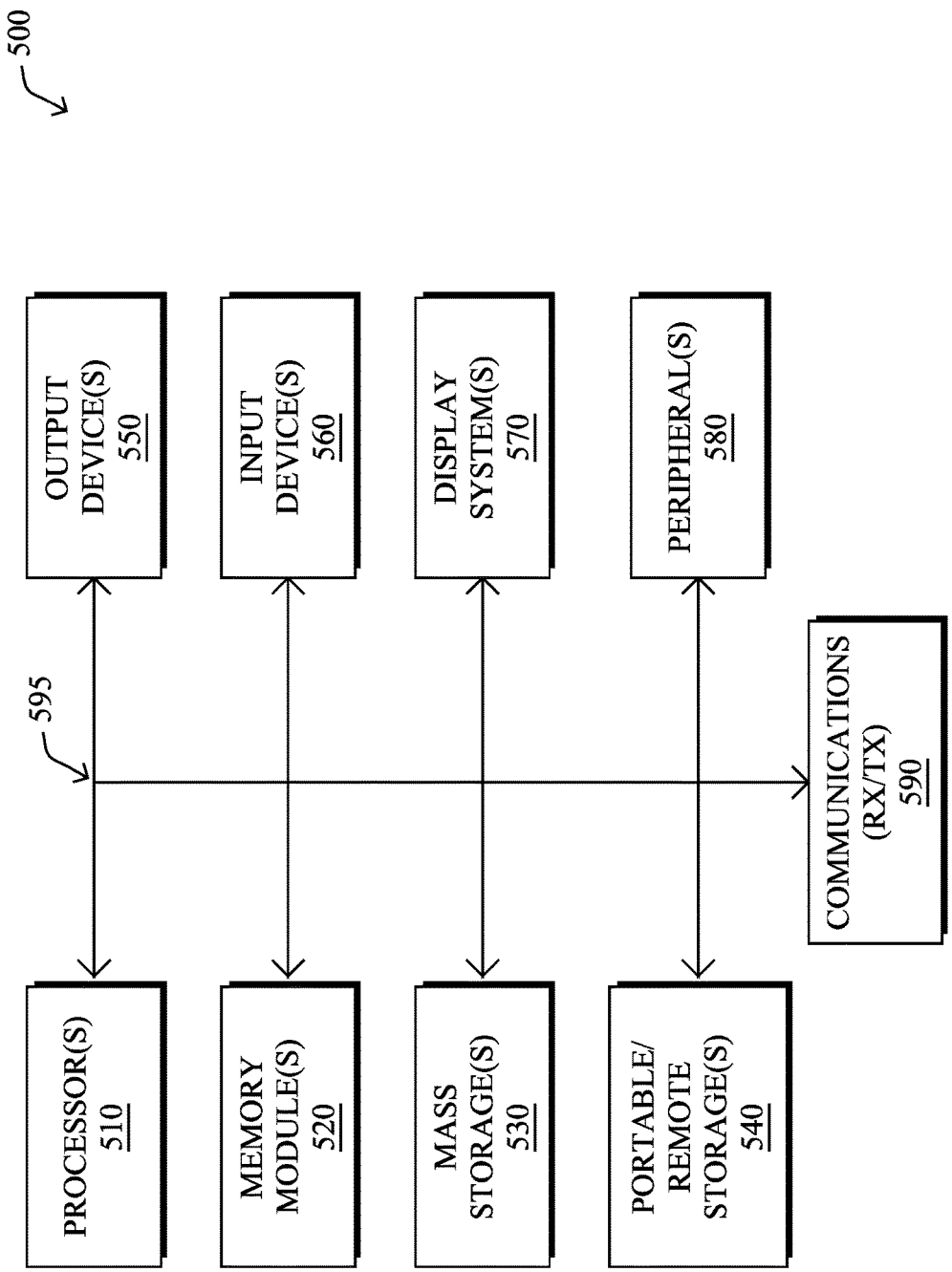
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Breaking Down Load Time of Web Pages into Coherent Components—

As mentioned above, the performance of a webpage is influenced by multiple architectural components, often owned by different teams within a customer organization. Identifying which component is the bottleneck is a key step in performance optimization/troubleshooting, because it narrows the investigation greatly and allows customers to route problems to the right team. A traditional approach is to divide the system into "frontend", "backend", and "network" components, but these categories have no discernable meaning, nor do they currently have straightforward manners to be measured.

Figure 6:
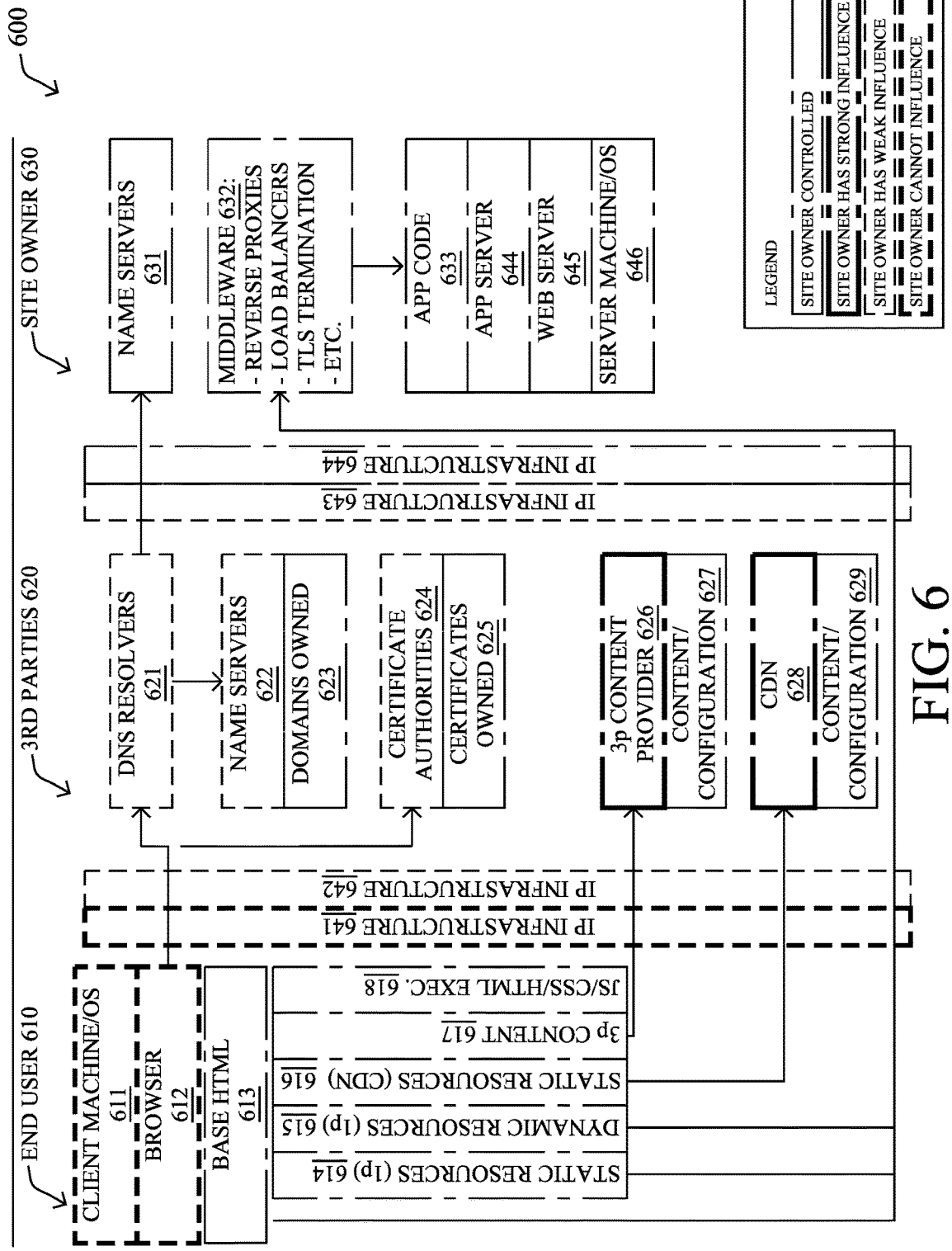
FIG. 6 illustrates an example anatomy of a web page load.

To understand the problem better, FIG. 6 illustrates the anatomy of a page load 600, namely the primary components involved in loading a typical, modern, complex webpage loaded by an end user 610, using various third-parties 620, for a website as controlled by the site owner 630, as will be understood by those skilled in the art. Notably, FIG. 6 includes an indication as to whether the specific components are controlled by the site owner 630, or where the site owner has strong, weak, or no influence over the components. In particular, from an end user perspective 610, there's the client machine and operating system (OS) 611, the browser 612 (e.g., Google Chrome, Mozilla Firefox, Microsoft Edge, etc.), and the base HTML 613. The HTML 613 generally has control over loading static resources (first-party or "1p") 614, dynamic resources (1p) 615, static resources (CDN) 616, third-party ("3p") content 617, and javascript (JS), style sheets (CSS), HTML, and other executables 618.

From the end user's local network (IP infrastructure) 641 and into the core network infrastructure 642, various third-parties 620 may be utilized, such as DNS resolvers 621, name servers 622 (storing domains 623 owned by the site owner), as well as certificate authorities 625 (storing certificates 625 owned by the site owner). In addition, various third-party content providers 626 may operate based on content/configuration 627 provided by the site owner, and CDNs 628 also operate based on content/configuration 629 provided by the site owner.

The core IP infrastructure then egresses (643) into the site owner's network 644, where name server 631 may exist (to communicate with DNS resolvers 621), as well as various middleware 632 (e.g., reverse proxies, load balancers, TLS termination, etc.). The ultimate website page may then be managed by the site owner according to app code 633 on app servers 644, on web servers 645, which operate on various server machines/operating systems.

Some helpful insights that can be drawn from FIG. 6 above may include the following:

The components are highly interconnected, so it is far from obvious how one should attribute page load time to categories like "frontend", "backend", and "network", even if there was an ability to measure everything from everywhere. For example, loading a dynamic resource (like an AJAX request or "XMLHttpRequest" (XHR)) is initiated by the frontend, mediated by the network, and served by a back-end server. To which category should it be attributed?

There are several parts that could be called "Network": the TCP/IP stacks on client and server, and the IP, DNS, and PKI systems, which are largely public. The customer has varying degrees of influence over these.

There are quite a few parts of the system that the site owner has very limited influence over. In certain embodiments, therefore, these components could be left out of performance analysis for certain site owners, or else these components could be categorized into a bucket of components that the site owner is unable to influence.

For at least these reasons, it is very difficult to identify if one or more components in the anatomy of a page load are performance bottlenecks. In particular, though many real-user monitoring (RUM) products provide some kind of breakdown, such as based on time segments (e.g., navigation timing), or else based on the "Frontend", "Backend", "Network", but these methods are questionable, and do not result in actionable categories that can be routed to teams.

The techniques herein, therefore, isolate actionable parts of the architectural tech stack (such as Core Frontend, Core Backend, Core Network, Third Party and Content Deliver Network (CDN)) as bottlenecks behind a modern complex web page load.

Specifically, according to one or more embodiments of the disclosure as described in detail below, a monitoring process (e.g., 248) monitors timing of navigations and resources of a web page load, and attributes timing of the navigations and resources into corresponding timing components. In particular, the monitoring process may attribute timing of static first-party resources and timing of hypertext transfer protocol (HTTP) redirects to a core frontend timing component, and may attribute timing of dynamic first-party resources to a core backend timing component. The monitoring process may also attribute timing of content delivery network (CDN) resources to a CDN timing component, and may attribute timing of non-CDN third-party resources to a third-party timing component. Lastly, the monitoring process may further attribute timing of network infrastructure connections to a core connections timing component.

Accordingly, the monitoring process may then perform one or more actions based on the attributing steps (i.e., the attributions of timing to respective timing components).

Notably, many challenges are presented in identifying performance bottlenecks within the page load system of FIG. 6, since the components are highly interconnected, and degree of control/influence varies among the components. When considering those components that the site owner 630 can actually influence, however, there are several, as follows:

Frontend and backend code and resources can be changed, and are typically owned by development teams;

Server hardware, OS, web server, and app server, as well as middleware components like reverse proxies, can be tuned or configured and are typically owned by app operations teams;

Site-owner-side network infrastructure like IP and name servers can be changed, and are typically owned by network operations teams;

Third Party Content, such as ads, trackers, and social widgets, are very common—site owners typically have a business relationship with these vendors and can influence them (e.g., by reconfiguring them or complaining about service level agreement (SLA) violations); and Content Delivery Networks (CDNs) are a very common special case of a third party, where the content itself is provided by the customer but hosted by the CDN (again, site owners can reconfigure the CDN and complain about SLA violations).

These observations form the basis for many aspects of the techniques herein, and how the page load time can be broken down. For instance, some of the page load time is spent executing the HTML, CSS, and JS code, which should be considered part of "frontend" category. CDN and third-party resources should each have their own categories, and for these resources, there is no need to categorize the time into either network or backend categories because the vendor is responsible for both. First-party resources are triggered by frontend code but processed by backend servers, so it's not completely clear how to attribute them. Also, although "the network" is highly ambiguous, there are some cases where the site owner can and should act, such as, for instance, if the cause of slowness is in network infrastructure they own, or in the way they've configured third-party infrastructure like the DNS. These types of network resources or navigations should also have their own category, optionally extricated from the non-influenceable parts of the network.

Figure 7:
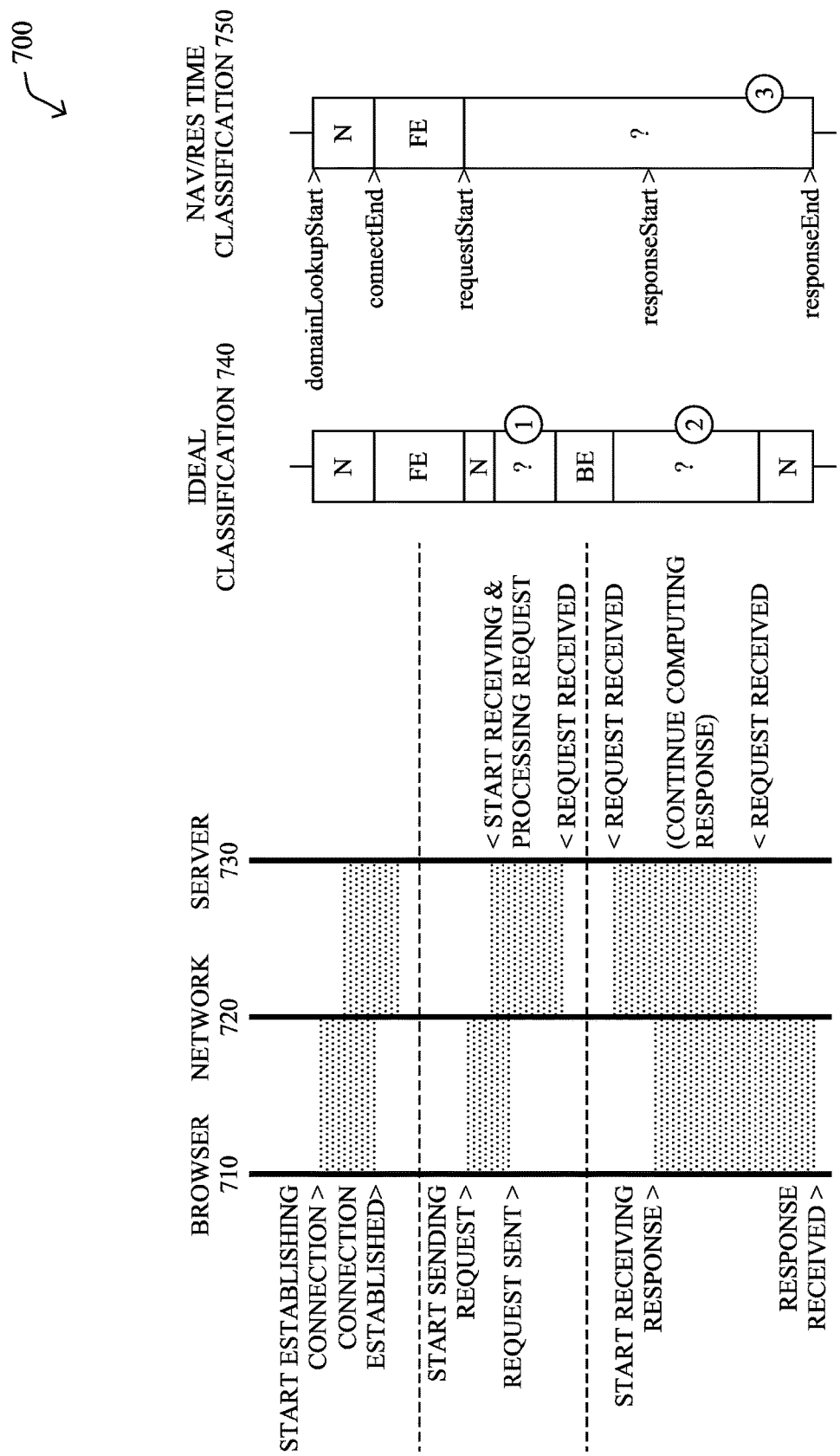
FIG. 7 illustrates an example of a single resource load.

FIG. 7 illustrates a single resource load timeline 700, where a web browser 710 starts and establishes a connection through network 720 to some server 730. After sending a request, the server can process and respond to the request with the resource. As can be seen in an "ideal classification" 740, there are a few points where only one component {frontend (FE), backend (BE), or network (N)} is active, so a monitoring process could unambiguously attribute the time to that component. However, there are large blocks ("1" and "2") where multiple components are active, so it remains ambiguous. To further complicate the issue, in practice one can only use measurements from the browser, which are obtained from Navigation Timing and Resource Timing APIs. This expands the region of ambiguity in actual classification 750 to include almost the entire request (block "3").

In practice, only the initial connect time can be attributed to the "network" (and optionally broken down into DNS, TCP, SSL). For the remainder of the request, the network processing becomes generally entangled with frontend and backend processing.

To properly classify first-party resources, since there's currently no way to untangle the timing, the techniques herein take a pragmatic approach, attributing time to the category where the root-cause of slowness is most likely to lie. For instance, for static resources like CSS files, JS files, images, etc., the most common optimizations come from changes to the frontend code and the resources themselves: e.g., minify, combine, compress, or eliminate the resources. In particular, it is relatively rare in the art to fix a slow CSS download by optimizing the site owner's servers. As such, it would be pragmatic to count static resources as frontend time.

Conversely, dynamic resources, such as AJAX requests or XHRs, often do trigger some expensive backend code such as database (DB) queries, and the most common optimizations take place there. Moreover, an acute slowdown for a dynamic resource is almost certainly due to a problem in the backend. Accordingly, it is pragmatic to count the dynamic resources as backend time.

Notably, for both types of first-party resources (static and dynamic), they may be preceded by some HTTP redirects. Redirects may be optimized by using the right URL to begin with, which is generally a frontend fix, and as such, it is pragmatic to count HTTP redirects as frontend time.

In order to determine which resources are first-party, CDN, or third-party, the techniques herein may be based on certain manual configuration overrides, but generally acceptable behavior can be achieved by using IP address blocks, documented by the CDNs themselves, for CDNs, and DNS lookups to identify first-party resources. Anything that is neither CDN nor first-party can then be classified as third-party (e.g., a catch-all). Other techniques may be used, such as using ad block and social media registries to identify third-party resources. (Note also that it is better to use IP addresses than domains to detect CDNs, as many companies use vanity domains for their CDN content.)

The result of the analysis above is that the following breakdown of Timing Components are defined, into which the various resources may be attributed:

Core Frontend;
Core Backend;
Core Connections;
CDN; and
Third-party.

Figure 8:
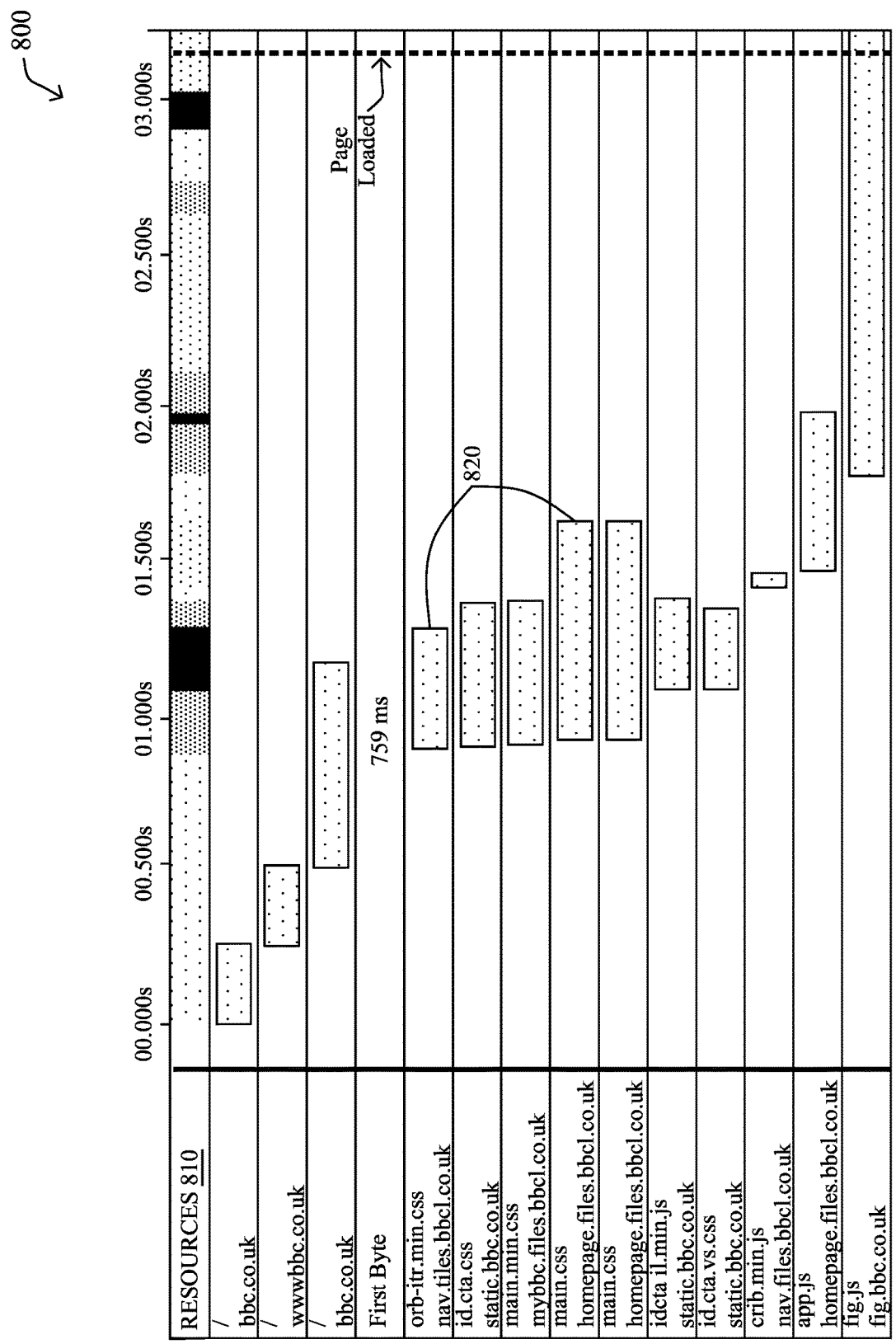
FIG. 8 illustrates an example of a typical waterfall (time chart) of a page load.

Now that the Time Components have been broken down into their most useful classifications, the techniques herein may provide further information to fully allow for grokking the concepts of concurrency. In particular, the techniques herein can now attribute portions of the page load time to the above Timing Components. If resource loads were serial, this would be easy: just add up all the time spent in each category. However, as shown in FIG. 8, an example of a typical waterfall (time chart) 800 of a page load shows that many resources 810 are being loaded at any given time (overlapping load windows 820).

Figure 9:
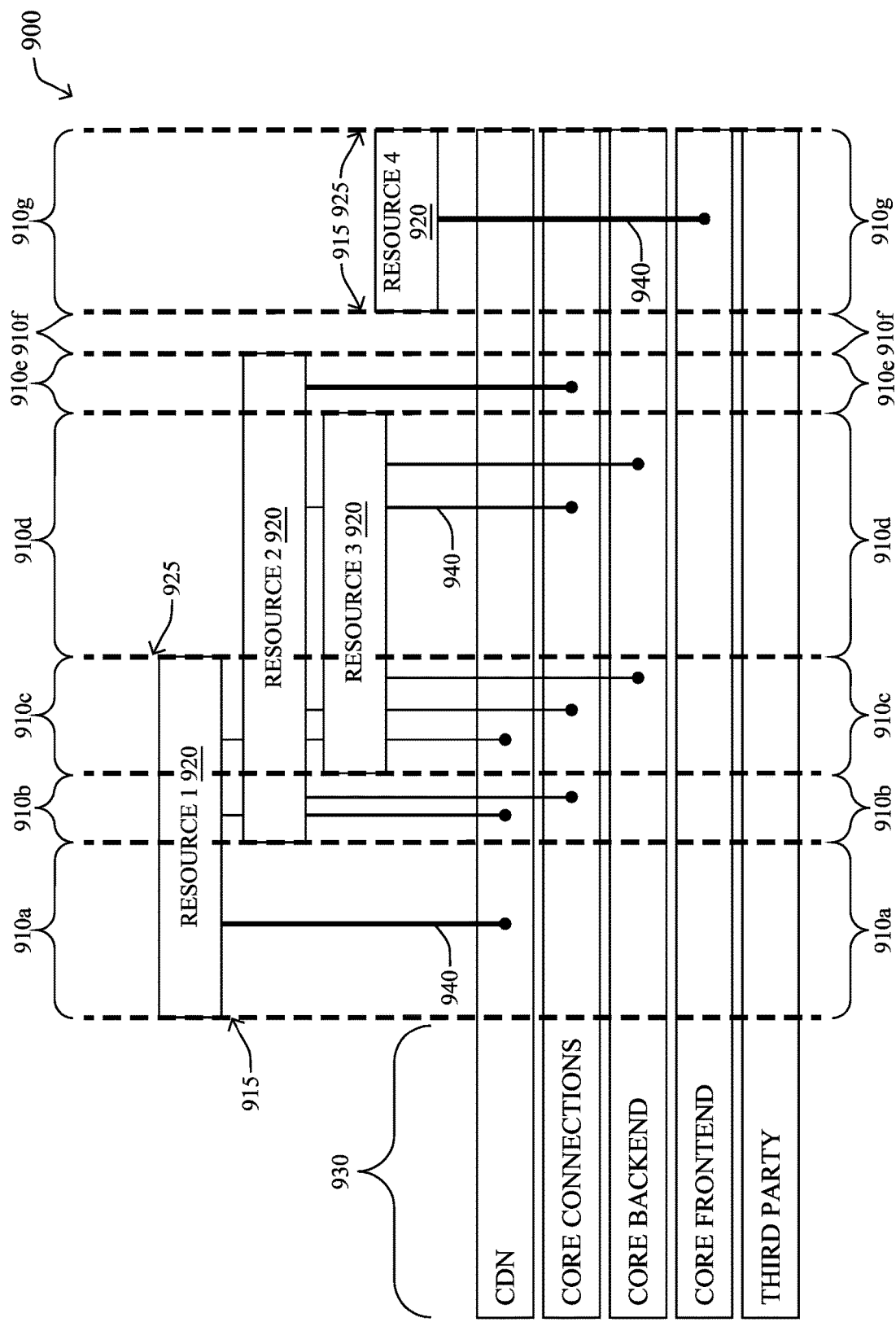
FIG. 9 illustrates an example of resource concurrency.

One approach herein is to declare that when multiple Timing Components are active at the same time (i.e., are concurrent), then the techniques herein may prorate that time-slice across the Timing Components. FIG. 9 illustrates an example depiction 900 of this concept and proposed algorithm. Namely, the techniques herein may divide the page load time into discrete spans 910 (910a-g) that start at the beginning of each resource load (start time 915 for resources 920, e.g., "1" through "4"), and end at the completion (end time 925) of each resource load. For each span, the techniques herein may illustratively:

i) Count the number of resources in each Timing Component 930 active during that span;
ii) Distribute the time of the span to each Timing Component, using the number of resources in that Timing Component as the weighting factor (e.g., as illustrated generally by the thicknesses of the associated connecting lines 940); and
iii) If there is a span where nothing is happening (e.g., 910f), then attribute it to the Core Frontend code processing Timing Component.

This algorithm results in values for each Timing Component that add up to the total load time, and also "penalizes" categories that stand out as long poles, while benefitting categories that do their work concurrently, which is desirable because concurrency does indeed reduce load times in general.

FIGS. 10A-10B illustrate an example chart 1000 (that refers to the Navigation Timing and Resource Timing APIs), delineating the time components (names) 1010 and their definition 1020, as well as their general actionable root causes 1030 and any limitations/conflating factors 1040. As shown, for example, core connections 1011 may be defined to start at dnsStart and ends at connectEnd for all first-party resources. If there are any issues here, then actionable root causes may be that the DNS is misconfigured, that SSL is misconfigured, and so on. As also noted, latency or limited bandwidth may conflate the issue, as would client machine saturation, a public DNS problem, a PKI problem, and so on. Similar example correlations are further demonstrated in the chart 1000 for each of the time components (core backend 1012, core frontend 1013, CDN 1014, and third-party 1015), the contents of which being incorporated herein.

Figure 11:
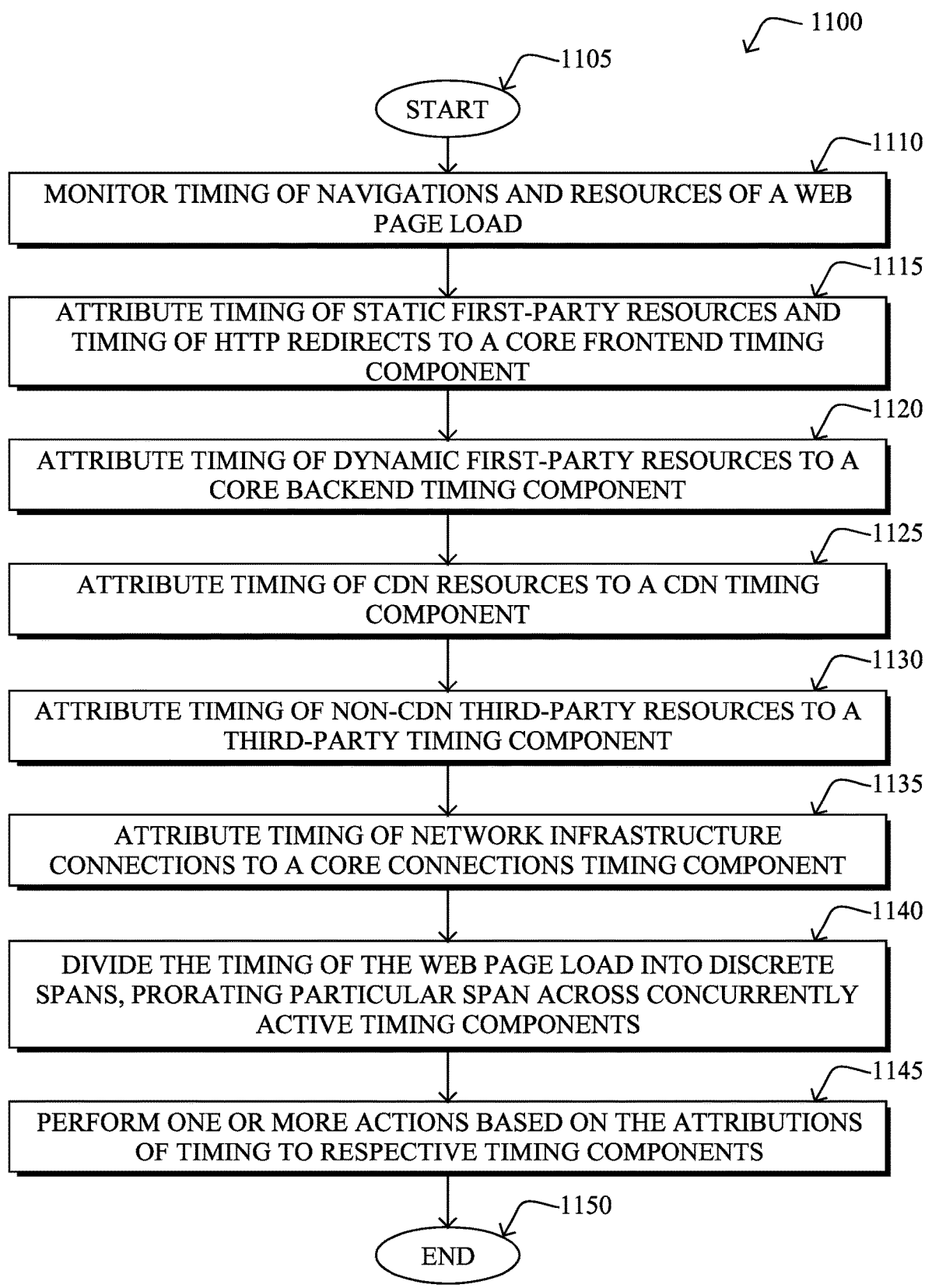
FIG. 11 illustrates an example simplified procedure for breaking down the load time of a web page into coherent components in accordance with one or more embodiments described herein.

FIG. 11 illustrates an example simplified procedure for breaking down the load time of a web page into coherent components in accordance with one or more embodiments described herein. For example, a non-generic, specifically configured device (e.g., device 200) may perform procedure 1100 by executing stored instructions (e.g., process 248). The procedure 1100 may start at step 1105, and continues to step 1110, where, as described in greater detail above, a monitoring process monitors timing of navigations and resources of a web page load. As described above, the monitoring process may identify the resources and navigations in a number of ways, such as, for example:

determining CDN resources based on a corresponding IP address being located within IP address blocks for one or more known CDNs;
determining first-party resources based on a DNS lookup;
determining third-party resources based on resources being neither CDN resources nor first-party resources; and
determining network infrastructure connections as one or more of a DNS connection, a TCP connection, and an SSL connection (notably, network infrastructure connections may be limited to only connections under at least partial first-party control, as mentioned above).

In the following steps (1115 through 1135), the monitoring process attributes navigations and resources to corresponding timing components as follows:

Step 1115: attributing timing of static first-party resources and timing of HTTP redirects to a core frontend timing component (e.g., where static first-party resources comprise one or more of stylesheets, javascript files, or images, etc.);
Step 1120: attributing timing of dynamic first-party resources to a core backend timing component (e.g., where dynamic first-party resources comprise one or more of Ajax requests or XHRs);
Step 1125: attributing timing of CDN resources to a CDN timing component;
Step 1130: attributing timing of non-CDN third-party resources to a third-party timing component; and
Step 1135: attributing timing of network infrastructure connections to a core connections timing component (notably optionally distinguishing DNS, TCP, and SSL connections as sub-components of the core connections timing component, as mentioned above).

In one embodiment herein, in step 1140 the monitoring process may divide the timing of the web page load into discrete spans (e.g., as described above in FIG. 9), with each span beginning at a corresponding start of either a navigation or a resource. In response to a plurality of particular timing components being concurrently active during any particular span, the monitoring process may prorate that particular span across the plurality of particular timing components (e.g., distributing a timing of that particular span to each of the plurality of particular timing components based on a number of resources and navigations in each respective timing component of the plurality of particular timing components, as detailed above). Note that as also described above, the monitoring process may further attribute any idle time spans to the core frontend timing component.

In step 1145, the monitoring process may perform one or more actions based on the attributing steps above (i.e., the attributions of timing to respective timing components). For example, the monitoring process may display or otherwise report the attributions of timing to respective timing components, or else one or more alarms may be triggered based on the attributions of timing to respective timing components (e.g., certain timing components being over a certain length of time or a certain percentage of overall time, etc.). Other actions, such as detecting and mitigating anomalies based on the attributions of timing to respective timing components, may also be performed herein, such as comparing current values to baseline values or other running averages in order to detect unexpected outliers.

The simplified procedure 1100 may then end in step 1150, notably with the ability to continue monitoring new page loads (initial page loads or virtual page loads, such as for single page applications (SPAs), etc.).

Notably, with regard to virtual page loads (e.g., single page app (SPA) virtual pages), by correctly determining which resources are triggered by a particular virtual page load, then the techniques herein as described above also apply to virtual pages (except that they do not have base pages, as may be appreciated by those skilled in the art).

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, break down the load time of a web page into coherent components. In particular, as described above, the techniques herein help isolate actionable parts of the architectural tech stack (e.g., Core Frontend, Core Backend, Core Network, Third Party and CDN) as bottlenecks behind a modern complex web page load. Previous attempts to break down the page load time have been focused on providing detailed numbers, but the techniques herein provide further information to interpret the numbers. That is, the techniques herein propose both a categorization approach to make the data actionable, as well as a way to calculate the breakdown between categories. Notably, while the techniques herein can be based on existing metrics provided by the browser, they solve the concurrent loading problem that has generally been an obstacle when one attempts to break down the provided metrics.

In addition, the techniques herein use both navigation timing and resource timing to break down page load time into the five categories that are the most useful breakdown. For instance, separating CDN and third-party resources is useful in routing problems to the right team (or, in this case, 3rd-party organization). Also, since Core Connection Time is computed by measuring only the time taken to establish network connections to first-party HTTP servers, this is better than including third-party servers because it will be correlated with problems in the site owner's network, which indeed are the actionable ones, so as to not cause false alarms when there is a problem with a third-party's network. Further, Core Backend Time may be computed by measuring the time taken to load resources that are dynamic and therefore likely to be bottlenecked at the server, which is better than just measuring the time-to-first-byte, because that omits dynamic resources like dynamic requests (e.g., AJAX) which are increasingly common and having an increasing impact on web page performance. Still further, Core Frontend Time may be computed by measuring the time taken to load resources that are static and therefore likely to be optimized by changing frontend code, which is better than just measuring the time from first-byte to page-load, because that includes AJAX requests which are more likely to be backend-bound. Lastly, since many of these resources load concurrently, assigning page-wide timing numbers would be ambiguous (i.e., what if two resources were loading at the same time, from different categories?), and the techniques herein, therefore, define an algorithm to perform attribution during concurrency as well (e.g., as shown in FIG. 9).

In still further embodiments of the techniques herein, a business impact of the load time of a web page can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the load time of a web page with various business transactions in order to better understand the affect the load times may have had on the business transactions, accordingly.

Illustratively, the techniques described herein may be performed by hardware, software, and/or firmware, such as in accordance with the illustrative Page Load Monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   monitoring, by a monitoring process, timing of navigations and resources of a web page load;
   attributing, by the monitoring process, timing of static first-party resources and timing of hypertext transfer protocol (HTTP) redirects to a core frontend timing component;
   attributing, by the monitoring process, timing of dynamic first-party resources to a core backend timing component;
   attributing, by the monitoring process, timing of content delivery network (CDN) resources to a CDN timing component;
   attributing, by the monitoring process, timing of non-CDN third-party resources to a third-party timing component;
   attributing, by the monitoring process, timing of network infrastructure connections to a core connections timing component; and
   performing, by the monitoring process, one or more actions based on the attributing steps.

2. The method as in claim 1, further comprising:
   dividing the timing of the web page load into discrete spans, each span beginning at a corresponding start of either a navigation or a resource; and
   in response to a plurality of particular timing components being concurrently active during any particular span, prorating that particular span across the plurality of particular timing components.

3. The method as in claim 2, wherein prorating comprises:
   distributing a timing of that particular span to each of the plurality of particular timing components based on a number of resources and navigations in each respective timing component of the plurality of particular timing components.

4. The method as in claim 2, further comprising:
   attributing idle time spans to the core frontend timing component.

5. The method as in claim 1, further comprising:
   determining CDN resources based on a corresponding internet protocol (IP) address being located within IP address blocks for one or more known CDNs.

6. The method as in claim 1, further comprising:
   determining first-party resources based on a domain name server (DNS) lookup.

7. The method as in claim 1, further comprising:
   determining third-party resources based on resources being neither CDN resources nor first-party resources.

8. The method as in claim 1, further comprising:
   determining network infrastructure connections as one or more of a domain name server (DNS) connection, a transmission control protocol (TCP) connection, and a secure socket layer (SSL) connection.

9. The method as in claim 8, further comprising:
   distinguishing DNS, TCP, and SSL connections as subcomponents of the core connections timing component.

10. The method as in claim 1, further comprising:
    determining network infrastructure connections as only connections under at least partial first-party control.

11. The method as in claim 1, wherein static first-party resources comprise one or more of stylesheets, javascript files, or images, and wherein dynamic first-party resources comprise one or more of Ajax requests or Extensible Markup Language Hypertext Transfer Protocol Requests (XHRs).

12. The method as in claim 1, wherein the one or more actions comprise at least one of: displaying attributions of timing to respective timing components; reporting the attributions of timing to respective timing components; triggering one or more alarms based on the attributions of timing to respective timing components; and detecting and mitigating one or more anomalies based on the attributions of timing to respective timing components.

13. A tangible, non-transitory, computer-readable medium storing program instructions that cause a computer to execute a process comprising:
    monitoring timing of navigations and resources of a web page load;
    attributing timing of static first-party resources and timing of hypertext transfer protocol (HTTP) redirects to a core frontend timing component;
    attributing timing of dynamic first-party resources to a core backend timing component;
    attributing timing of content delivery network (CDN) resources to a CDN timing component;
    attributing timing of non-CDN third-party resources to a third-party timing component;
    attributing timing of network infrastructure connections to a core connections timing component; and
    performing one or more actions based on the attributing steps.

14. The computer-readable medium as in claim 13, wherein the process further comprises:
    dividing the timing of the web page load into discrete spans, each span beginning at a corresponding start of either a navigation or a resource; and
    in response to a plurality of particular timing components being concurrently active during any particular span, prorating that particular span across the plurality of particular timing components.

15. The computer-readable medium as in claim 14, wherein prorating comprises:
    distributing a timing of that particular span to each of the plurality of particular timing components based on a number of resources and navigations in each respective timing component of the plurality of particular timing components.

16. The computer-readable medium as in claim 13, wherein the process further comprises:

determining CDN resources based on a corresponding internet protocol (IP) address being located within IP address blocks for one or more known CDNs;

determining first-party resources based on a domain name server (DNS) lookup; and determining third-party resources based on resources being neither CDN resources nor first-party resources.

17. The computer-readable medium as in claim 13, wherein the process further comprises:

determining network infrastructure connections as one or more of a domain name server (DNS) connection, a transmission control protocol (TCP) connection, and a secure socket layer (SSL) connection.

18. The computer-readable medium as in claim 13, wherein the process further comprises:

determining network infrastructure connections as only connections under at least partial first-party control.

19. The computer-readable medium as in claim 13, wherein the one or more actions comprise at least one of: displaying attributions of timing to respective timing components; reporting the attributions of timing to respective timing components; triggering one or more alarms based on the attributions of timing to respective timing components; and detecting and mitigating one or more anomalies based on the attributions of timing to respective timing components.

20. An apparatus, comprising:

one or more network interfaces to communicate with a network;

a processor coupled to the network interfaces and configured to execute one or more processes; and a memory configured to store a process executable by the processor, the process when executed configured to:

monitor timing of navigations and resources of a web page load;

attribute timing of static first-party resources and timing of hypertext transfer protocol (HTTP) redirects to a core frontend timing component;

attribute timing of dynamic first-party resources to a core backend timing component;

attribute timing of content delivery network (CDN) resources to a CDN timing component;

attribute timing of non-CDN third-party resources to a third-party timing component;

attribute timing of network infrastructure connections to a core connections timing component; and perform one or more actions based on the attributing steps.

* * * * *

UNITED STATES PATENT AND TRADEMARK OFFICE
CERTIFICATE OF CORRECTION

Page 1 of 1

PATENT NO. : 10,785,281 B1
APPLICATION NO. : 16/293913
DATED : September 22, 2020
INVENTOR(S) : Adam Ross Cath et al.

It is certified that error appears in the above-identified patent and that said Letters Patent is hereby corrected as shown below:

In the Specification

In Column 5, Line 34, please amend as shown:
application consists of one or more tiers, and a tier consists Signed and Sealed this
Twenty-ninth Day of December, 2020

Andrei Iancu
*Director of the United States Patent and Trademark Office*